Sept. 29, 1959 T. R. O'MEARA ET AL 2,907,029
APPARATUS FOR RECORDING INFORMATION FROM RADIO DIRECTION FINDERS
Filed July 19, 1957
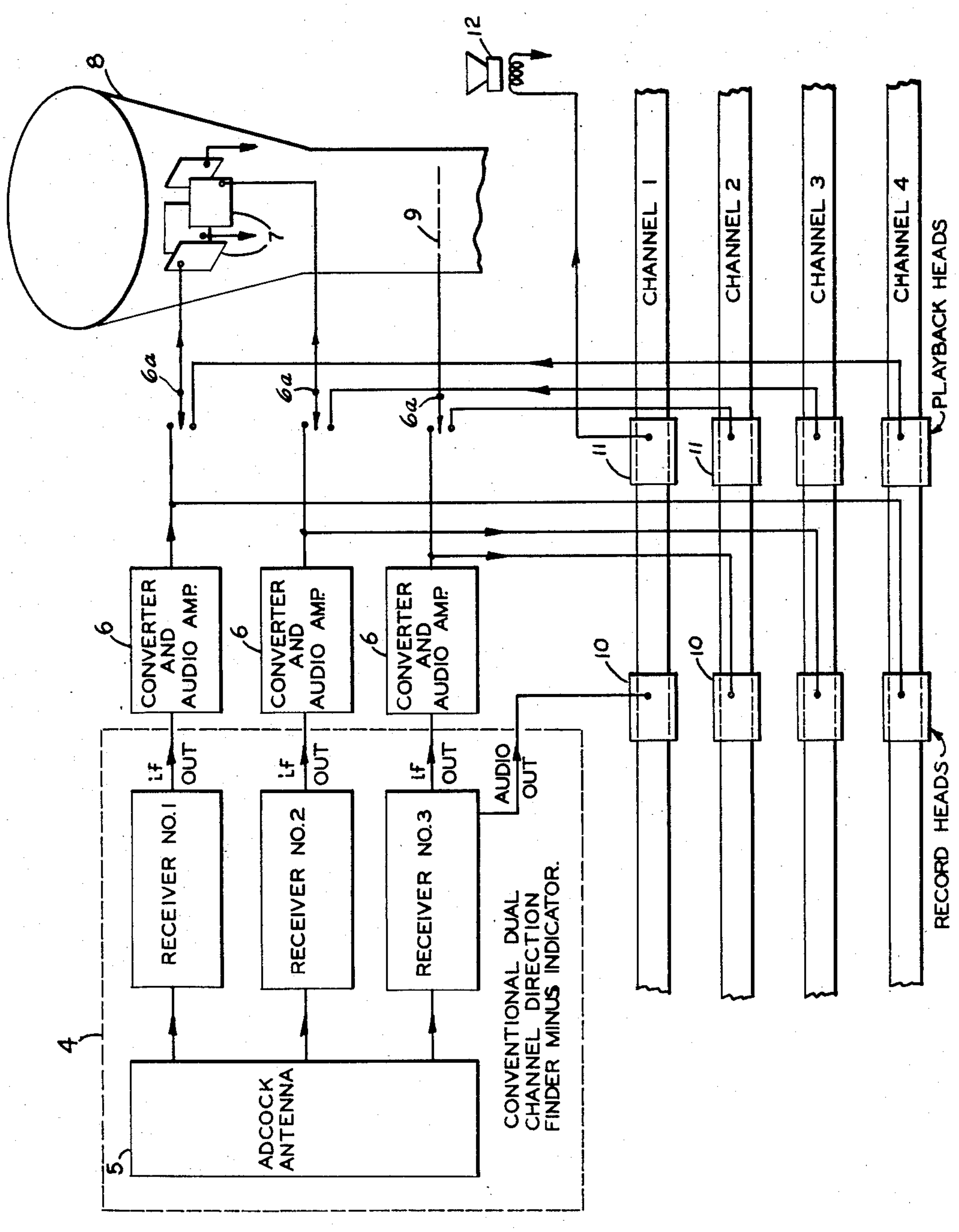
INVENTORS
THOMAS R. O'MEARA
HAROLD D. WEBB
BY W. R. Maltby
Paul M. Klein Jr.
ATTORNEYS United States Patent Office 2,907,029

Patented Sept. 29, 1959

2,907,029

APPARATUS FOR RECORDING INFORMATION FROM RADIO DIRECTION FINDERS

Thomas R. O'Meara, Los Angeles, Calif., and Harold D. Webb, Urbana, Ill., assignors, by mesne assignments, to the United States of America as represented by the Secretary of the Navy Application July 19, 1957, Serial No. 673,100

3 Claims. (Cl. 343—113)

This invention relates to direction finders and more particularly to an apparatus for recording information from a radio direction finder.

An object of the invention is to provide an apparatus especially suitable for use with a Watson-Watt or dual-channel type direction finder for recording information from such a direction finder with only a simple modification of the direction finder.

Other objects and many of the attendant advantages of this invention will be readily appreciated as the same becomes better understood by reference to the following detailed description when considered in connection with the accompanying drawing wherein the single figure is a schematic drawing of an apparatus constituting one preferred embodiment of the invention.

Reference is now made to the drawing. Three receivers Nos. 1, 2 and 3 are shown as being part of a conventional Watson-Watt or dual-channel direction finder generally indicated at 4 but minus the usual indicator. The receivers are supplied from an Adcock antenna array 5. Receivers Nos. 1 and 2 provide the directional information and receiver No. 3 is in the sensing channel. To facilitate recording, the intermediate frequency output of each receiver (which is usually a low radio frequency, 175 or 455 kc.) is converted in a converter and audio amplifier 6 to a second intermediate frequency which is preferably a reasonably low audio frequency in order to minimize the required bandwidth of the recording device. This second intermediate frequency could be about 1 kilocycle per second, for example. This frequency would then constitute the new carrier and would have, say, 5 kc./sec. sidebands extending the output spectrum to frequencies as high as 6 kc./sec.

By means of switches *6a*, when thrown to the upward position as viewed in the drawing, the output from the converters connected to receivers 1 and 2 can be connected to scope plates 7 of a conventional oscilloscope 8 to give directional information and the output of the converter connected to receiver No. 3 can be applied in the usual manner to the grid 9 of the scope to provide sense indication. For recording the bearing information a multichannel recorder of any suitable type is provided. Shown is a four-channel magnetic tape recorder with recording heads 10 and playback heads 11. By throwing the switches *6a* downward as shown in the figure, the playback heads 11 from the 4 channels are connected to the oscilloscope to play back the information recorded on the tape. Although for clarity in illustration the tapes are shown as being separate, they may, of course, be constituted by a single tape wide enough to record separately the information from the several recording heads. Since it is usually desirable to record the intelligence communicated by the received signal as well as the bearing of the signal source, an audio output emanating from a detector in receiver No. 3 is provided to record intelligence on channel No. 1. A loud speaker for monitoring this intelligence is shown at 12.

In using such a low carrier frequency, 1 kc./sec. as mentioned above, the converted sidebands of this second intermediate frequency would overlap and cause considerable distortion of the message information, but no essential distortion of direction-of-arrival information would occur. That is, nothing but correct bearings can result from such a system, assuming that the frequency converters and second intermediate frequency amplifiers are phase and gain matched. Since the message information is taken from the output of receiver No. 3 directly to channel No. 1, as mentioned hereinbefore, the message information can be recorded with this system without distortion.

As shown in the drawing the second intermediate frequency is used not only for recording on the recording tape but also for a bearing display of the usual type in the cathode ray tube. The tape recording preserves the instantaneous relative phase and amplitude between the two channels and an exact duplicate of the bearing will be obtained upon playback of the tape recording. Although magnetic tape is illustrated, obviously other recording media such as wire, discs, etc., can be substituted.

Certain advantages of recording bearings in this fashion are that high speed bearings can be recorded and immediately played back to give missed or inaccurately determined bearings; any bearing can be stored for relatively long periods of time; and original bearings can be recorded and observed at the same time that previously recorded bearings are being observed with the use of a separate monitor oscilloscope. This last can be accomplished in one particular case by displaying an original bearing with one beam of a multi-beam oscilloscope while other pickup heads (spaced at intervals along the tape) are displaying this same bearing which arrived at earlier time intervals. This use of multi-pickup heads is essentially an autocorrelation type device, and other autocorrelation circuits can be used with any desired number of pickup heads, together with suitable circuitry, to evaluate the autocorrelation integral and increase the effective signal to noise ratio.

If desired a fifth channel can be used to record timing information so that the playback of the tape would yield not only the signal bearings but the exact time of day at which the signal arrived.

This system is especially adapted to a remote display apparatus since it is much easier to send the bearing signal information to a remote point when the output is in the audio frequency range than when it is at a radio frequency of, say, 455 kc./sec.

Obviously many modifications and variations of the present invention are possible in the light of the above teachings. It is therefore to be understood that within the scope of the appended claims, the invention may be practiced otherwise than as specifically described.

What is claimed is:

1. In a dual channel radio direction finder system including a pair of receivers for receiving direction information and a third receiver for receiving sense information; a converter for converting the intermediate frequency output of each of said receivers to a second intermediate frequency in the audio range; a multichannel audio recording device for recording separately in synchronism the output of each of said converters whereby a record is made of the instantaneous bearings determined by the system; said audio recording device including playback apparatus for generating an electrical signal in response to the playing-back of the information recorded by said audio recording device; a cathode ray oscilloscope for displaying information; and switches for connecting said oscilloscope on the one hand to said converters to display information received directly from said converters and, alternatively, on the other hand, to said playback apparatus to display information recorded by said audio recording device.

2. The system of claim 1 wherein said third receiver emits a detected audio signal and including a fourth recording channel synchronized with the other recording channels for recording said detected audio signal and further including audio playback equipment for producing an audible signal played back from information recorded on said fourth recording channel.

3. The system of claim 2 wherein said audio recording device includes magnetic recording tape to record the direction and sense information received by said receivers.

References Cited in the file of this patent

UNITED STATES PATENTS

| | | |
|---|---|---|
| 2,402,688 | Skurnick | June 25, 1946 |
| 2,513,315 | Hawkins | July 4, 1950 |
| 2,800,654 | De Rosa | July 23, 1957 |